W. T. BAKER.
Cultivator.

No. 96,379. Patented Nov. 2, 1869.

Witnesses:

Inventor:

United States Patent Office.

WILLIAM T. BAKER, OF LANCASTER, TEXAS.

Letters Patent No. 96,379, dated November 2, 1869.

IMPROVEMENT IN CULTIVATORS.

The Schedule referred to in these Letters Patent and making part of the same.

*To all whom it may concern:*

Be it known that I, WILLIAM T. BAKER, of Lancaster, in the county of Dallas, and State of Texas, have invented a new and useful Improvement in Cultivators; and I do hereby declare that the following is a full, clear, and exact description thereof, which will enable others skilled in the art to make and use the same, reference being had to the accompanying drawings, forming part of this specification.

This invention relates to a new and useful improvement in machines for cultivating the ground; and It consists in the manner of hanging and regulating the cultivator-plows, as will be hereinafter more fully described.

In the accompanying plate of drawings—

Similar letters of reference indicate corresponding parts.

A is the double-tree, to which the plows are attached.

B is the regulating-bar, which is used for checking or marking off land.

The two outer plows are set at the width desired; then set the gauge-points B' to corresponding widths from the outside plows; then, after passing once across the field, the cultivator is driven so as to have the gauge-points B' pass over the last furrow.

C represents the cases which the plows run in, and which are fastened to the frame E.

D represents the plow-beams.

The cases C rest on the frame E, and they may be moved on the frame, as may be desired.

F represents rods, which connect the levers with the plows, by link or eye-bolts, with long screw-threads at each end, for regulating the depth of the plows.

G represents the levers (to which the upper ends of the rods F are attached) for setting or throwing out the plows.

Figure 1:
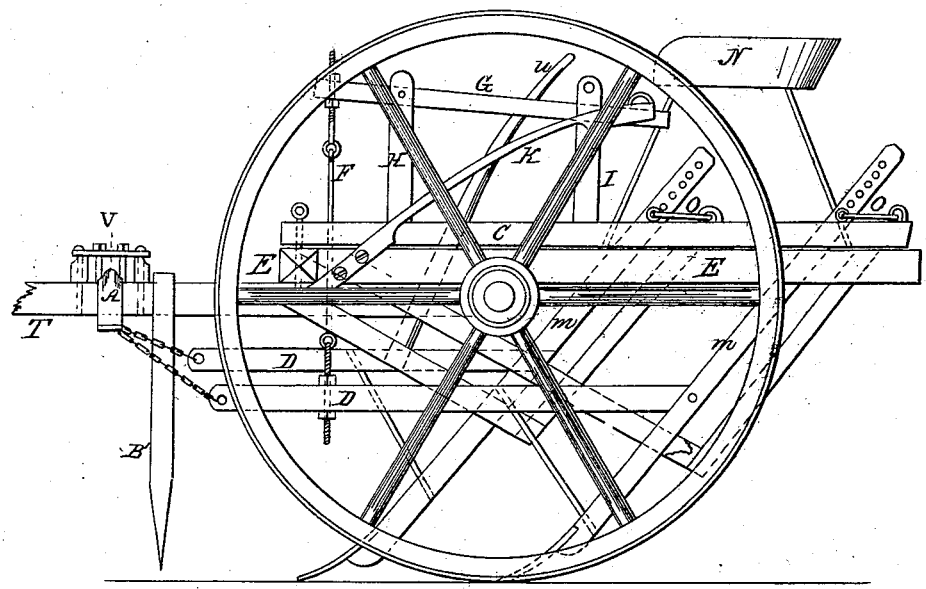
Figure 1 represents a side elevation of the machine.
Figure 2:
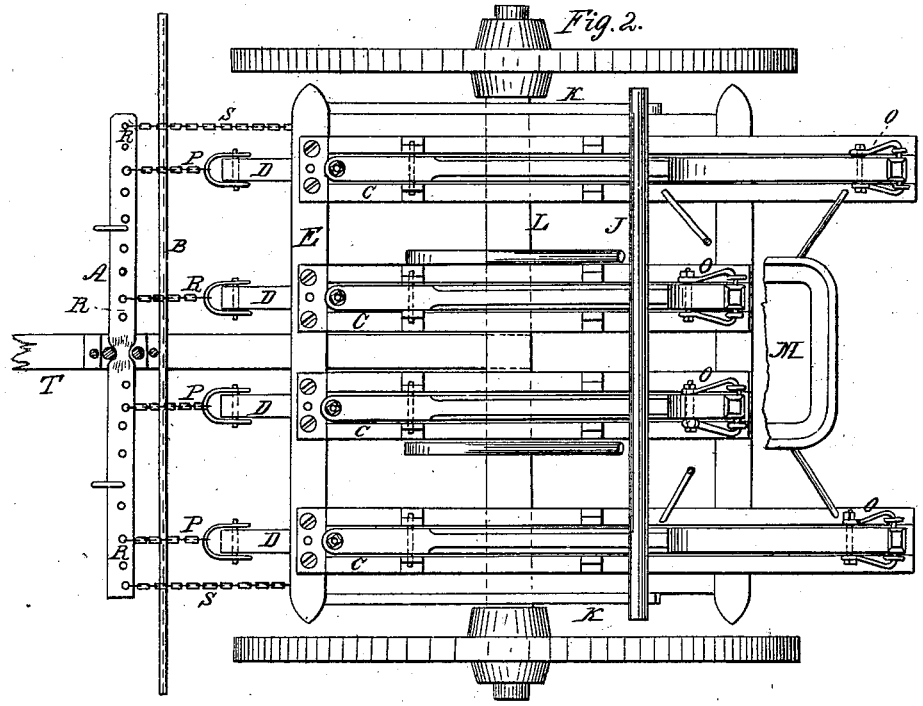
Figure 2 is a top or plan view.

These levers have their fulcra on the stands H. (See fig. 1.)

I represents the back guide-stands of the levers.

J is a foot-piece, which passes over the tops of the levers, and is connected with the frame by the springs K, by which all the plows may be thrown from the ground at once.

L is the axle.

N is the seat.

To the back ends of the plow-stocks *m*, there are devices O, set so as to regulate the plows, or prevent them from being forced in.

The upper ends of the stocks *m* are provided with a series of holes, which allows the plows to be adjusted, as to height, by the clevises as seen in the drawing.

P represents the clevises and chains by which the beams of the plows are attached to the double-tree A.

R represents the double-tree clevises, to which the chains are attached, and which are adjustable on the double-tree, as seen in the drawing.

S represents chains or rods, fastened to the double-tree, and to a stud or bolt in the axle, for supporting the outer ends of the double-tree.

T represents the tongue of the cultivator.

The double-tree is confined on the tongue by a vertical loop, V, so that it has plenty of play up and down. Its central portion is a vertical section, with its sides turned at right angles with the ends, with the short parallel portion resting on the tongue, confined, as before stated.

It will be seen, that by this arrangement, the plows may be set so as to run at any desired depth, and that they may be simultaneously thrown from the ground by the pressure of the foot of the driver.

There are handles, U, attached to two or more of the plow-cases C, for moving the inside plows laterally, when such movement is required for avoiding obstructions, or for other purposes.

The whole arrangement is such that the plows are entirely under the driver's control at all times, thus suiting the cultivator to various kinds of culture to which the ordinary cultivator is not adapted.

Having thus described my invention,

I claim as new, and desire to secure by Letters Patent—

1. The cases C, in combination with the frame E, for supporting and guiding the beams and stock of the plow, arranged substantially as described.

2. The combination of the springs K, rod J, and levers G, arranged as described.

3. The foot-piece J and springs K, by which the plows may be simultaneously thrown from the ground.

4. The clevises O, arranged substantially as shown and described, in combination with the stock *m* of the plow, for regulating the depth of the plow, substantially as described.

5. The combination of the rods F, having, at either end, adjustable screw-bolts and nuts, as shown, with the levers G and beams D, all arranged, as described, to regulate the depth and angle of inclination of the several plows, in the manner set forth.

6. In combination with a cultivator, the double-tree A, constructed and arranged substantially as and for the purposes herein shown and described.

WILLIAM T. BAKER.

Witnesses:
EUGÈNE BRUNET,
W. L. KILLER